(12) United States Patent
Landau

(10) Patent No.: US 6,279,094 B1
(45) Date of Patent: Aug. 21, 2001

(54) METHOD AND APPARATUS FOR MANAGING INVALIDATION OF VIRTUAL MEMORY MAPPING TABLE ENTRIES

(75) Inventor: Charles R. Landau, Santa Clara, CA (US)

(73) Assignee: Compaq Computer Corporation, Houston, TX (US)

( * ) Notice: Subject to any disclaimer, the term of this patent is extended or adjusted under 35 U.S.C. 154(b) by 0 days.

(21) Appl. No.: 09/137,763

(22) Filed: Aug. 20, 1998

Related U.S. Application Data
(60) Provisional application No. 60/093,064, filed on Mar. 23, 1998.

(51) Int. Cl.[7] .............................. G06F 12/08; G06F 12/10
(52) U.S. Cl. .......................... 711/203; 711/206; 711/208
(58) Field of Search .................................. 711/200, 203, 711/206, 207, 208, 209, 221

(56) References Cited

U.S. PATENT DOCUMENTS

| | | | |
|---|---|---|---|
| 4,584,639 | * | 4/1986 | Hardy ................................... 713/200 |
| 6,075,938 | * | 6/2000 | Bugnion et al. ..................... 711/148 |

OTHER PUBLICATIONS

Norman Hardy, "KeyKOS Architecture," Operating Systems Review, vol. 19, n. 4, Oct. 1985, pp. 8–25.

Document entitled "A Programmer's Introduction to EROS," URL:http://www.cis.upenn.edu/~eros/devel/intro/ProgrmrIntro.html, 14 pages total. (publication date unknown).

Norman Hardy, "The KeyKOS Architecture," Eighth Edition (Dec. 1990), Copyright © Key Logic, eight pages total.

Richard Rashid, Acadis Tevanian, Michael Young, David Golub, Robert Baron, David Black, William Bolosky and Jonathan Chew, "Machine–Independent Virtual Memory Management for Paged Uniprocessor and Multiprocessor Architectures," Department of Computer Science, Carnegie Mellon University, Pittsburgh, Pennsylvania 15213, $2^{nd}$ Symposium on Architectural Support for Programming Languages and Operating Systems, ACM Oct., 1987, eight pages total.

* cited by examiner

Primary Examiner—Do Hyun Yoo
Assistant Examiner—Yamir Encarnacion
(74) Attorney, Agent, or Firm—Fenwick & West LLP

(57) ABSTRACT

A method and apparatus that operates within an object oriented virtual memory management system. The invention relates to invalidating mapping tables that are pointed to by PMOs (Partitioned Memory Objects). The PMOs specify locations of pages within the entire memory space of a process. The mapping tables specify locations of pages that have been swapped into a primary memory. In a preferred embodiment of the present invention, each PMO includes a plurality of MORs. Each MOR includes an involved bit. When a page is swapped into memory, the involved bits in all MORs relating to the page are set (except for the last MOR on a level). When a page is swapped out of memory, the present invention allows the mapping tables for the page to be invalidated in an efficient manner. Once a MOR having an involved bit clear is detected, there is no requirement to invalidate additional mapping tables for the path.

12 Claims, 18 Drawing Sheets

Object-Oriented Virtual Memory Scheme

Format of PMOs and MORs

Format of Mapping Table

Format of NSKMPage Data Structure

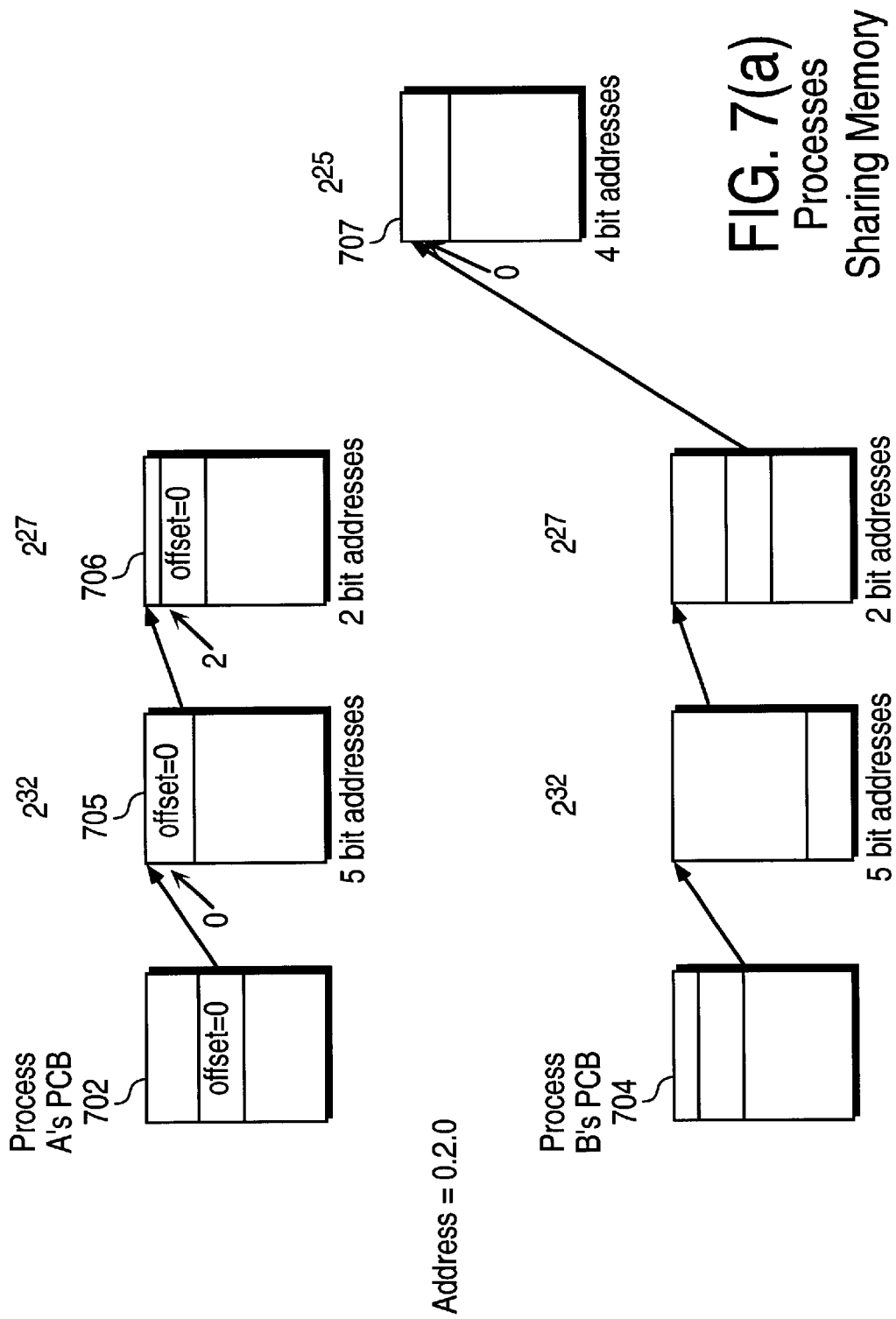

Processes Sharing Memory
(including an Uplevel Reference)

Addressing An Uplevel Reference

Servicing a Page Fault and Setting Involved Bits

Servicing a Page Fault and
Setting Involved Bits (Continued)

Example of Servicing a Page Fault
(Before mapping tables filled in and involved bits set)

Example of Servicing a Page Fault
(After mapping tables filled in and involved bits set)

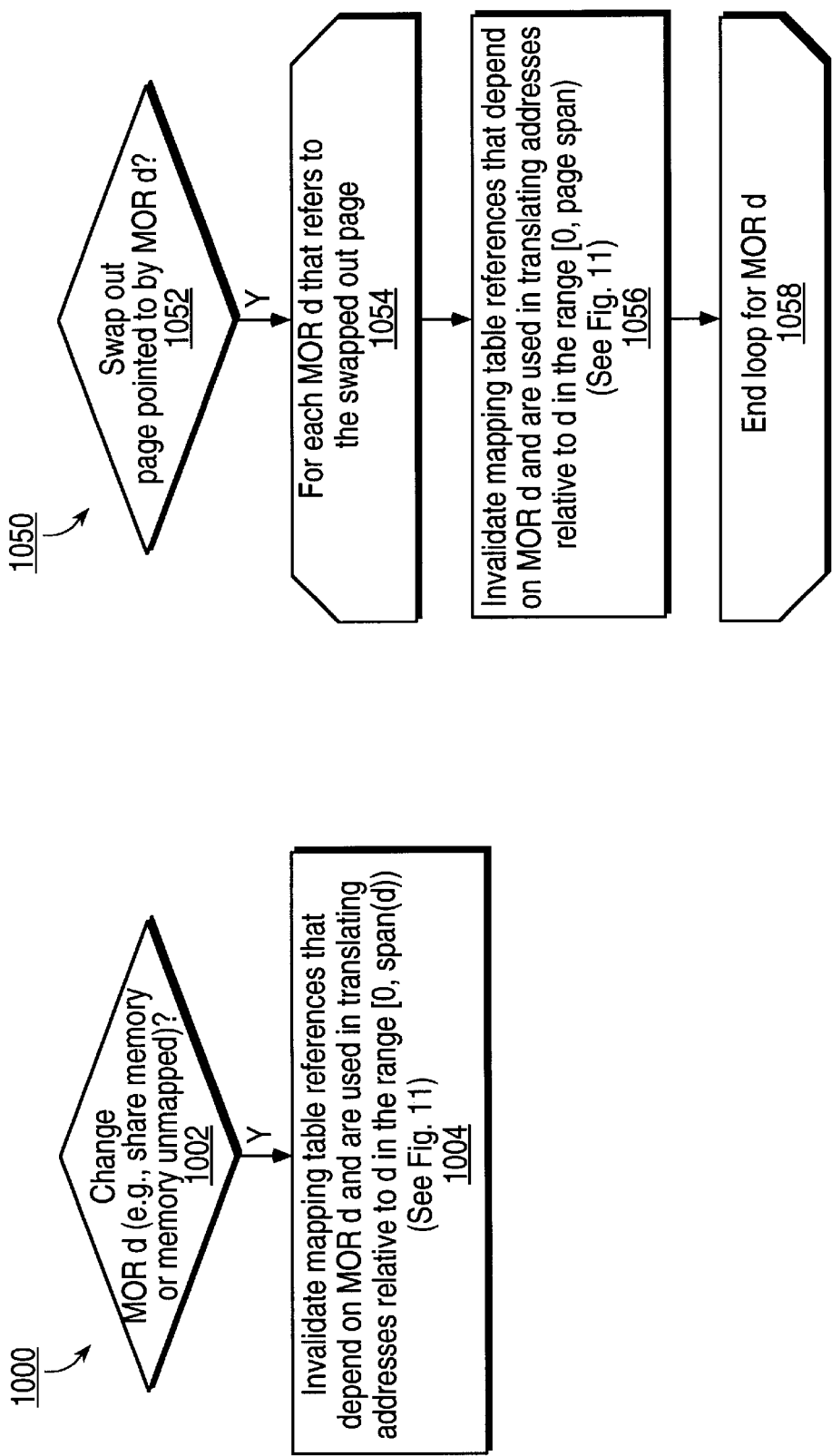
FIG. 10(b) Invalidating mapping tables when a page is swapped out
FIG. 10(a) Invalidating mapping tables when a MOR is changed Invalidating mapping table references that depend on a MOR d and are used in translating addresses relative to d in the range [x, x+s]

Invalidating mapping tables when part of memory is unmapped (before)

Invalidating mapping tables when part of memory is unmapped (after)

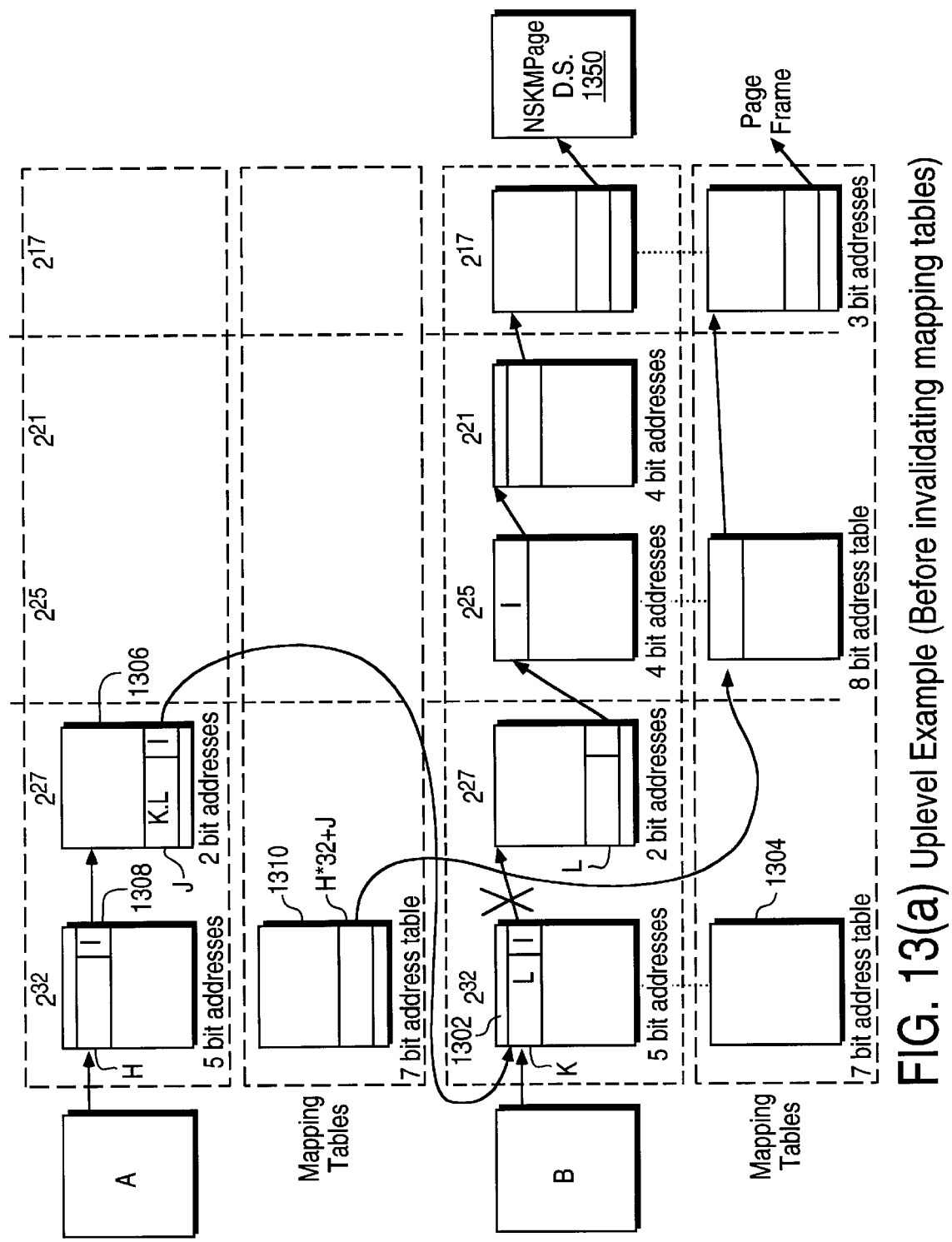
FIG. 13(a) Uplevel Example (Before invalidating mapping tables)

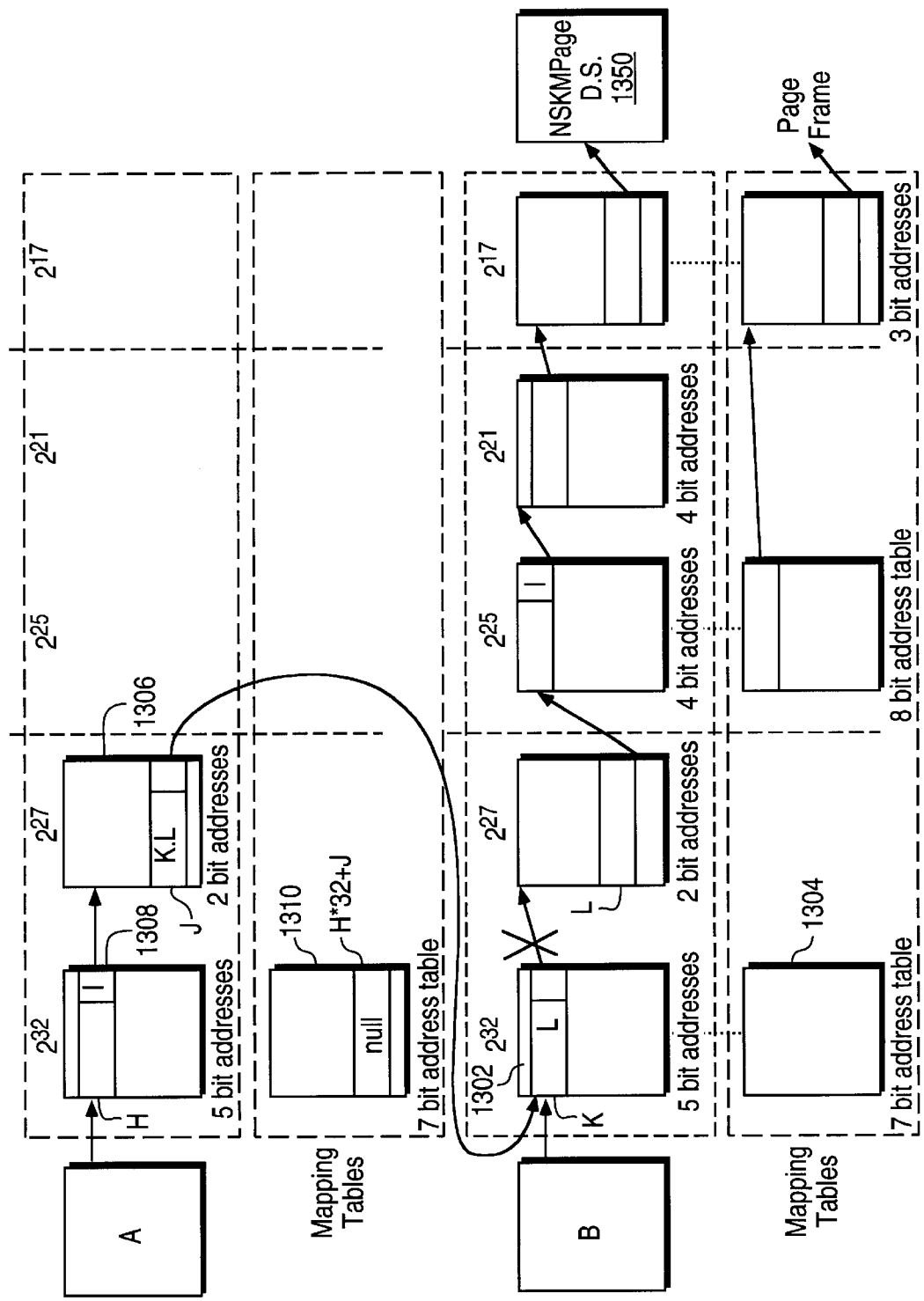
FIG. 13(b) Swapping out a page; Uplevel Example (After invalidating mapping tables)

METHOD AND APPARATUS FOR MANAGING INVALIDATION OF VIRTUAL MEMORY MAPPING TABLE ENTRIES

RELATED APPLICATIONS

This application claims priority under 35 U.S.C. §119(e) from U.S. Provisional Application No. 60/093,064, filed Mar. 23, 1998, of Landau, entitled "Method and Apparatus for Managing Invalidation of Virtual Memory Mapping Table Entries".

This invention is related to the following applications, which are herein incorporated by reference:
1) U.S. application Ser. No. 09/046,943, entitled "Method and Apparatus for Managing Copy on Write Operations in a Virtual Memory," of Charles Robert Landau, filed Mar. 23, 1998.
2) U.S. Provisional Application No. 60/093,064, entitled "Method and Apparatus for Managing Invalidation of Virtual Memory Mapping Table Entries, filed Mar. 23, 1998, of Landau,.

BACKGROUND OF THE INVENTION

The present invention relates generally to memory management in a computer system and, specifically, to a memory management system for a computer system having multiple levels of virtual memory mapping tables.

Many types of general purpose computers and data processing systems contain memory that is organized using a "virtual memory" scheme. In general virtual memory allows applications and/or processes that are executing in the computer to behave as if they have an unlimited amount of memory at their disposal. In actuality, the amount of memory available to a particular application or process is limited by the amount of memory in the data processing system and further limited by the number of concurrently executing programs sharing that memory. In addition, a virtual memory scheme hides the actual physical address of memory from the application programs. Application programs access their memory space using a logical address, which is then converted to a physical address by the data processing system.

A virtual memory system organizes memory in units called "pages." These pages are moved between a fast, primary memory and one or more larger and usually slower secondary, tertiary, etc. memories. The movement of pages (often called "swapping") is transparent to the applications or processes that are executed in the data processing system, enabling the applications or processes to behave as if they each have an unlimited amount of memory.

Various conventional systems, however, are somewhat inefficient, either in how they swap pages or in how they manage various aspects of "clean-up" associated with swapping memory pages, especially under circumstances where two or more executing processes are allowed to share memory between themselves.

SUMMARY OF THE INVENTION

A preferred embodiment of the present invention operates within an object-oriented virtual memory management system. In the virtual memory management system, each page is referenced by traversing a series of mapping tables, which point to pages present in memory. Each mapping table is associated with one of a plurality of Partitioned Memory Objects (PMOs). Each PMO includes a plurality of Memory Object References (MORs). The lowest level PMOs point to NSKMPage data structures or BMOs (not shown). The NSKMPage data structures keep track of all pages in the physical memory. BMOs keep track of pages in the virtual memory that are not in physical memory. Both PMOs and NSKMPage data structures are collectively called "memory objects."

Each MOR includes an "involved bit." When a page is swapped into memory, the involved bits in all MORs relating to the page are set (except for the last MOR on a level). When a page is swapped out of memory, or when a memory reference is changed, such as when memory is shared or unmapped, the present invention allows the mapping tables corresponding to altered memory references to be invalidated in an efficient manner. Once a MOR having an involved bit cleared is detected during invalidation of the mapping tables, there is no requirement to invalidate additional mapping tables for the page.

In accordance with the purpose of the invention, as embodied and broadly described herein, the invention relates to a method of invalidating an entry in a mapping table in a virtual memory, comprising the steps of: determining that a logical table entry in the virtual memory has changed; invalidating at least one mapping table entry, where the mapping table entry corresponds to a logical table entry that refers either directly or indirectly to the changed table entry, the invalidating step occurring if that logical table entry has its involved bit set; and stopping invalidating at least one mapping table entry, where the mapping table entry corresponds to a logical table entry that refers either directly or indirectly to the changed table entry, the stopping invalidating step occurring if that logical table has its involved bit clear.

In further accordance with the purpose of the invention, as embodied and broadly described herein, the invention relates to a method of servicing a page fault caused by a null entry in a mapping table in a virtual memory system, comprising the steps of: filling in a path of mapping table values to point to the page that caused the page fault; and setting an involved bit in a current logical table in the path when the memory object to which the logical table points has a span greater than the span of an entry in a current mapping table.

BRIEF DESCRIPTION OF THE DRAWINGS

The accompanying drawings, that are incorporated in and constitute a part of this specification, illustrate several embodiments of the invention and, together with the description, serve to explain the principles of the invention.

FIG. 7(a) is a diagram illustrating a first process sharing the memory space of a second process.

FIG. 10(a) is a flow chart showing steps performed to invalidate a mapping table entry when a MOR in the virtual memory tables is changed.

FIG. 10(b) is a flow chart showing steps performed to invalidate mapping table entries when a page is swapped out.

FIGS. 13(a) and 13(b) show a second example of invalidating mapping tables, in accordance with the involved bits.

DETAILED DESCRIPTION OF PREFERRED EMBODIMENTS

Reference will now be made in detail to preferred embodiments of the invention, examples of which are illustrated in the accompanying drawings. Wherever possible, the same reference numbers will be used throughout the drawings to refer to the same or like parts.

I. General Background

Figure 1:
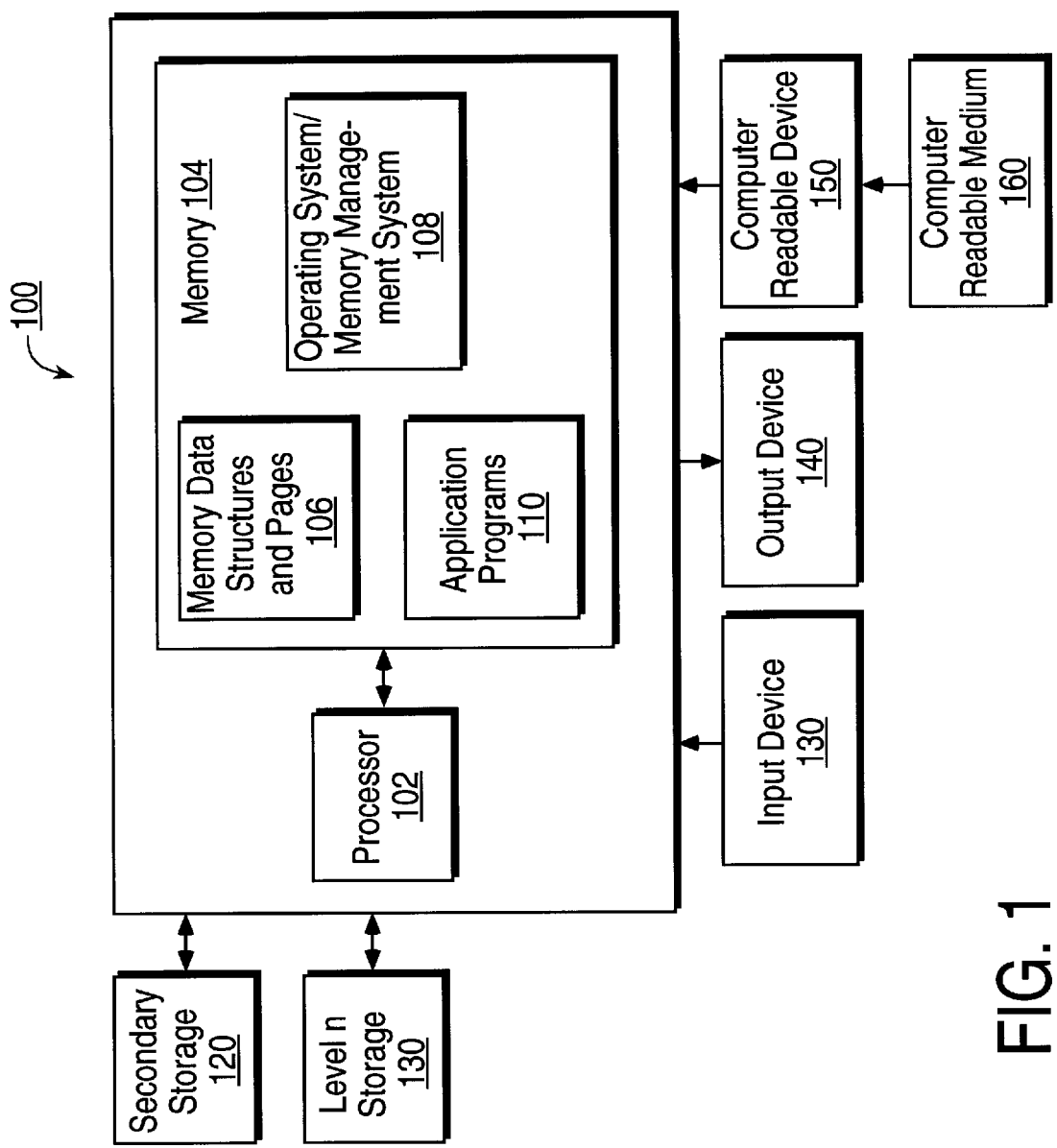
FIG. 1 is a block diagram of a data processing system in accordance with a preferred embodiment of the present invention.

FIG. 1 is a block diagram of a data processing system 100 in accordance with a preferred embodiment of the present invention. In FIG. 1, data processing system 100 includes a processor 102 and a storage area 104 (such as a memory). Storage area 104 includes application software programs 110, memory data structures and pages 106, and an operating system 108 including a memory management system. System 100 also includes additional storage, such as secondary storage 120 and level n storage 130. Secondary and level n storage 120, 130 preferably are larger, slower types of storage than storage 104. Storage 120, 130 are used to hold pages of memory that are not currently present in storage area 104 (i.e., pages that are "swapped out").

In a preferred embodiment of the present invention, operating system 108 is the Tandem Non-Stop operating system, release G05, available from Tandem Computers, Inc. of Cupertino, Calif.

System 100 includes an input device 130, such as a keyboard, a touchpad, or a mouse that receives input from a user or other appropriate source. System 100 also includes an output device 140, such as a display screen, a printer, etc. that outputs information to the user or other appropriate destination.

A person of ordinary skill in the art will understand that system 100 may also contain additional information, such as input/output lines; input devices, such as a keyboard, a mouse, and a voice input device; and display devices, such as a display terminal. System 100 may also may include application programs, operating systems, data, etc., which are not shown in the figure for the sake of clarity. It also will be understood that system 100 can also include numerous elements not shown, such as disk drives, keyboards, display devices, network connections, additional memory, additional CPUs, additional processors, LANs, input/output lines, etc.

In the following discussion, it will be understood that the steps of methods and flow charts discussed preferably are performed by processor 102 (or another appropriate processor) executing instructions stored in storage area 104 (or other appropriate memories). Specifically, the steps described herein are performed by operating system/memory management system 108 and are transparent to application programs 110. It will also be understood that the invention is not limited to any particular implementation or programming technique and that the invention may be implemented using any appropriate techniques for implementing the functionality described herein. The invention is not limited to any particular programming language or operating system.

Some or all of the instructions and data structures in memory 104 may be read into memory from a computer-readable medium 160. Execution of sequences of instructions contained in memory 104 causes processor 102 to perform the process steps described herein. In alternative embodiments, hard-wired circuitry may be used in place of or in combination with software instructions to implement the invention. Thus, preferred embodiments of the invention are not limited to any specific combination of hardware circuitry and software.

System 100 can also include an input device 150, which reads computer readable medium 160. The term "computer-readable medium" as used herein refers to any medium that participates in providing instructions to a processor for execution. Such a medium may take many forms, including but not limited to, non-volatile media, volatile media, and transmission media. Non-volatile media includes, for example, optical or magnetic disks, such as a storage device. Volatile media includes dynamic memory. Transmission media include coaxial cables, copper wire and fiber optics, including the wires that comprise a bus within a computer. Transmission media can also take the form of acoustic or light waves, such as those generated during radio-wave and infra-red data communications.

Common forms of computer-readable media include, for example a floppy disk, a flexible disk, a hard disk, magnetic tape, or any other magnetic medium, a CD-ROM, any other optical medium, punchcards, papertapes, any other physical medium with patterns of holes, a RAM, a PROM, an EPROM, a FLASH-EPROM, any other memory chip or cartridge, a carrier wave as described hereafter, or any other medium from which a computer can read.

Various forms of computer readable media may be involved in carrying one or more sequences of one or more instructions to a processor for execution. For example, the instructions of operating system 108 may initially be carried on a magnetic disk or a tape. The instructions are loaded into memory 104. Alternately, instructions can be sent over a telephone line using a modem. A modem local to the computer system can receive the data on the telephone line and use an infra-red transmitter to convert the data to an infra-red signal. An infra-red detector coupled to a bus can receive the data carried in the infra-red signal and place the data on the bus. The bus carries data to main memory, from which a processor retrieves and executes the instructions. The instructions received by main memory may optionally be stored on a storage device either before or after execution by a processor.

II. An Object-Oriented Virtual Memory System

Figure 2:
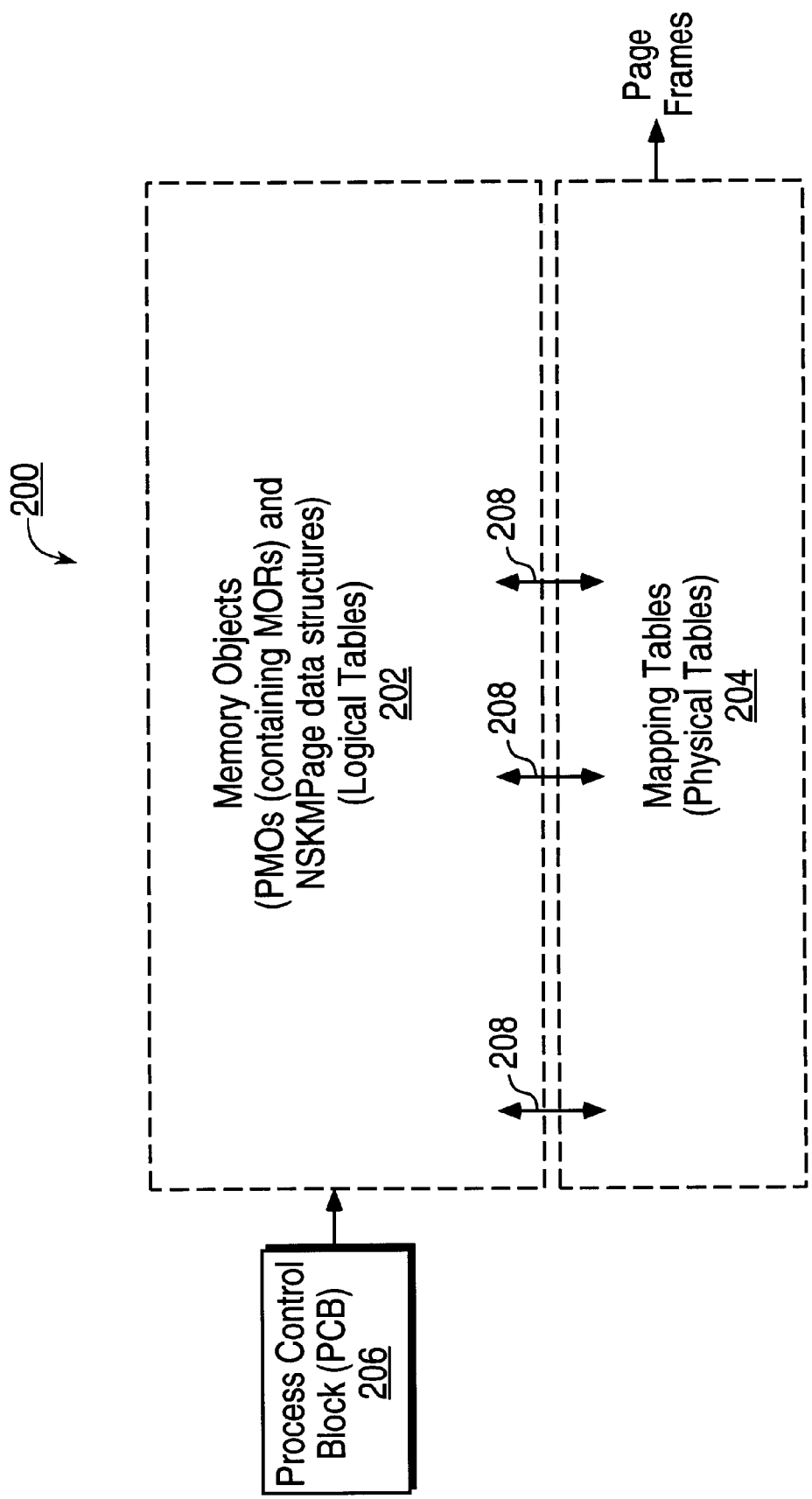
FIG. 2 is a diagram of data structures in an object-oriented virtual memory.
Figure 3:
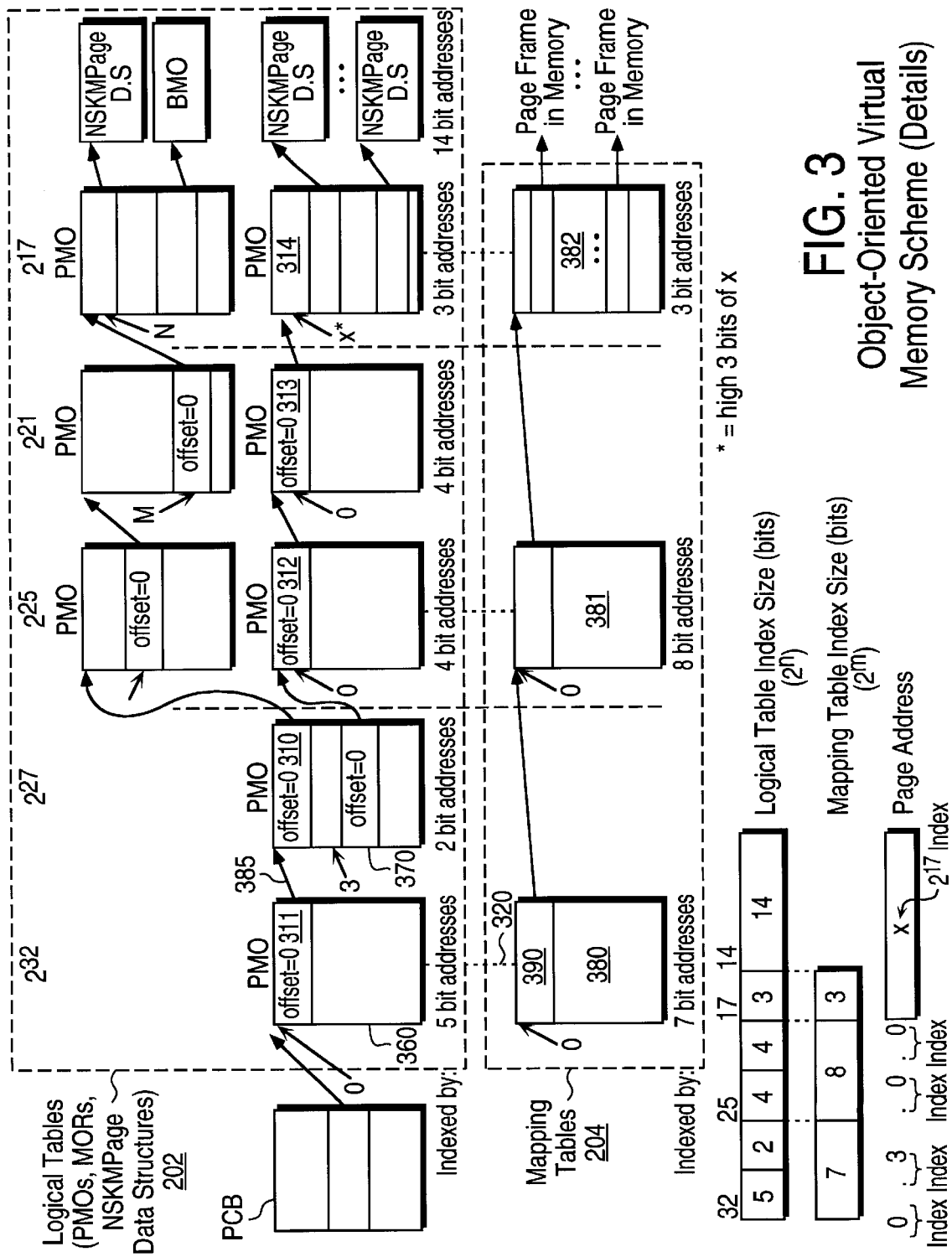
FIG. 3 is a diagram showing details of an example of logical and physical data structures in the object-oriented virtual memory of FIG. 2.

FIG. 2 is a diagram of data structures in an object-oriented virtual memory 200 in accordance with a preferred embodiment of the present invention. Only a portion of the virtual memory is shown. The object-oriented virtual memory 200 includes a PCB (Process Control Block) 206 that indicates a group of logical tables 202 for a process and a group of physical tables 204 for the process. Logical tables 202 map all the pages that are logically present in the address space of the process, whether the pages are swapped in or out. As will be described below in detail, logical tables 202 include PMOs (Partitioned Memory Objects) (which include MORs (Memory Object References)), NSKMPage data structures, and Basic Memory Objects (BMOs) as shown in FIG. 3. The physical tables 204 include mapping tables, which map locations for those pages that are physically present (i.e., that are swapped into memory 104). Each mapping table is associated with a PMO, as indicated by arrows 208.

The general concept of virtual memory is described, for example, in Patterson and Hennessy, "Computer Architecture, A Quantitative Approach," 2nd Edition, Morgan Kaufman, January 1996, which is herein incorporated by reference.

Figure 4:
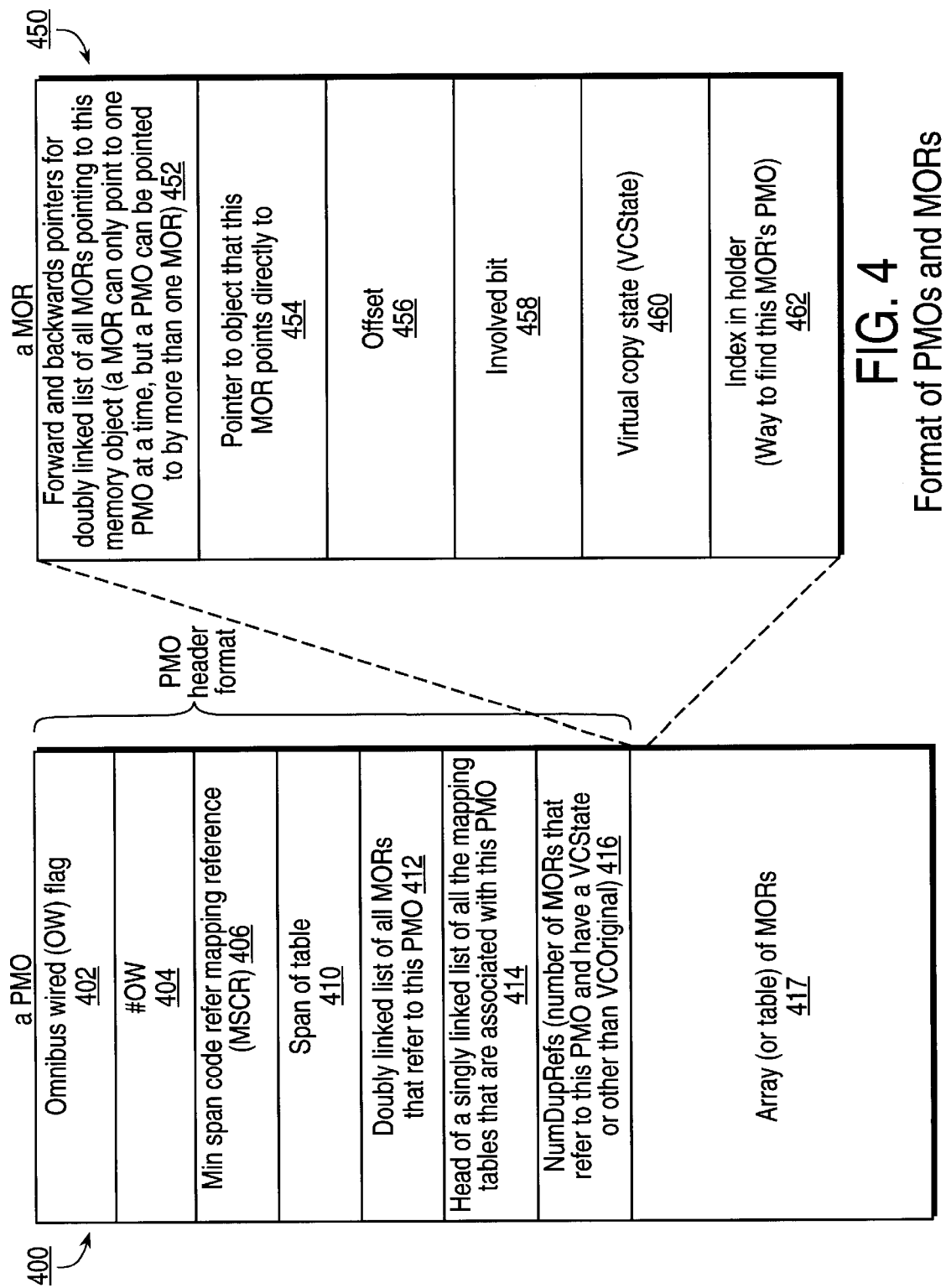
FIG. 4 is a diagram showing an exemplary format of a Partitioned Memory Object (PMO) data structure and an Memory Object Reference (MOR) data structure of FIG. 3.
Figures 5, 6:
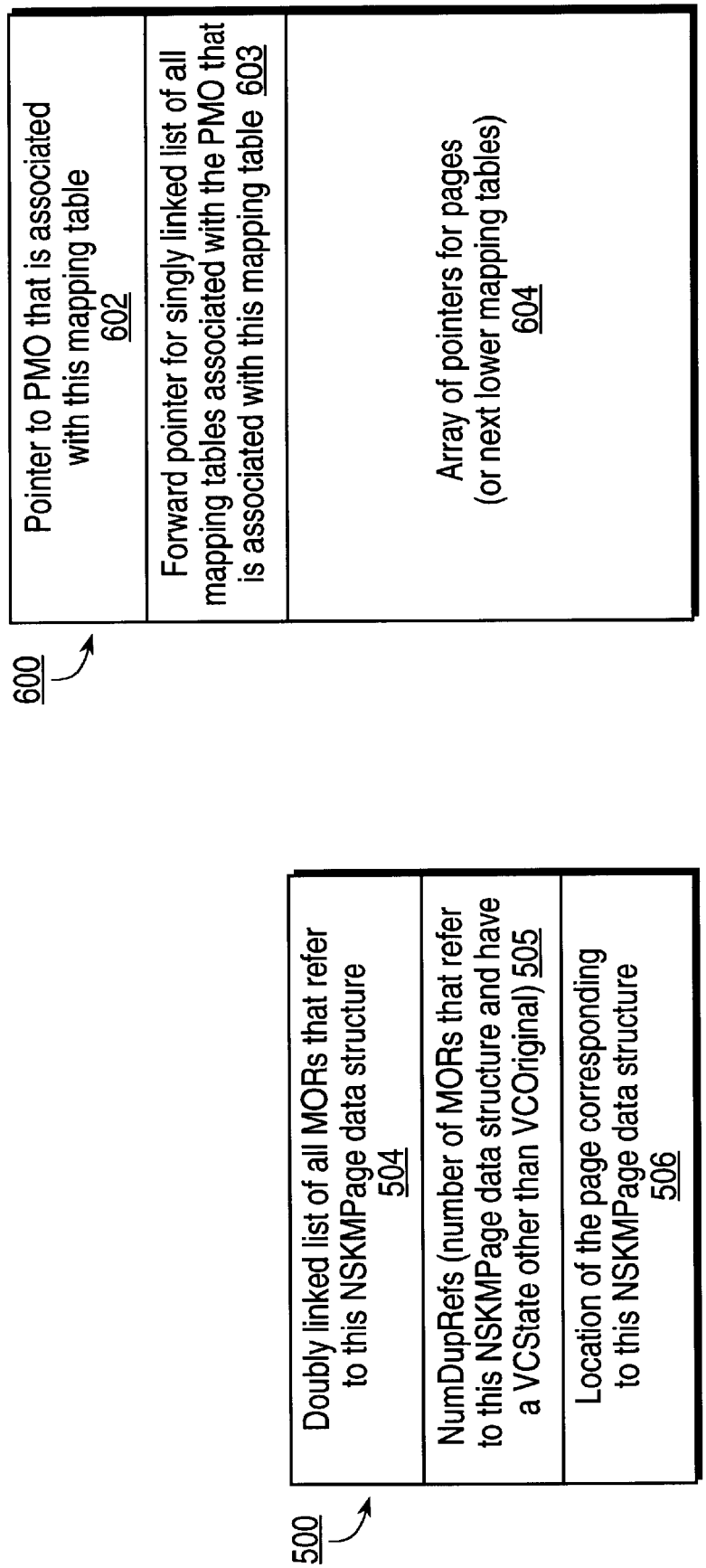
FIG. 5 is a diagram showing an exemplary format of an NSKMPage data structure of FIG. 3.
FIG. 6 is a diagram showing an exemplary format of a mapping table data structure of FIG. 3.

FIG. 3 is a diagram showing details of an example of logical and physical tables in the object-oriented virtual memory of FIG. 2. Details of exemplary formats of tables 202 and 204 are shown in FIGS. 4–6. It should be appreciated that the specific number of bits, number of levels, names of data structures, and so on, in FIG. 3 are provided for the sake of example and are not to be taken as a limitation of the invention. Similarly, although the tables are shown to be approximately the same size (vertically and horizontally), all the tables need not be the same size.

In the example of FIG. 3, both the logical tables 202 and the mapping tables 204 describe a full $2^{32}$ address space. However, mapping tables 204 only indicate whether a particular page is swapped in or out (and the location of the page if it is swapped in). In contrast, logical tables 202 indicate a location for every page in the $2^{32}$ address space. Each mapping table has a two-way "association" with a corresponding PMO in the logical tables. A PMO can be associated with one or more mapping tables. A mapping table can only be associated with one PMO.

Each PMO and each mapping table defines a certain number of addresses. This number is called a "span." For example, FIG. 3 shows an example in which a page having a virtual address of "0.3.0.0." is referenced. The notation "0.3.0.0.x" indicates successive portions of a memory address. The dots (".") separate portions of the address and the numerals indicate portions of the address, which can be varying numbers of bits long. In the example of FIG. 3, the first "0" portion of the address indexes PMO 360 and is five bits long. The "3" portion of the address indexes PMO 310 and is two bits long. The second "0" portion of the address indexes PMO 312 and is four bits long. The third "0" portion of the address indexes PMO 313 and is four bits long. The "X" portion of the address is seventeen bits long. In the example, each page is addressable by a thirty-two bit address. The number of address bits used to index each PMO 360, 310, 312, 313, and 314 is, respectively, 5, 2, 4, 4, and 3 bits. Thus, the number of MORs in each PMO is, respectively, $2^5$, $2^2$, $2^4$, $2^4$, and $2^3$ and the spans of the PMOs are, respectively, $2^{32}$, $2^{27}$, $2^{25}$, $2^{21}$, and $2^{17}$. The span of an entry/MOR in, for example PMO 360, (which itself has a span of $2^{32}$) is $2^{27}$ because each MOR in PMO 260 references a PMO of size $2^{27}$.

The number of address bits used to index each mapping table 380, 381, 382 is, respectively, 7, 8, and 3. Thus, the number of entries in each mapping table is, respectively, $2^7$, $2^8$, and $2^3$. The spans of the mapping tables are, respectively, $2^{32}$, $2^{25}$, and $2^{17}$.

An exemplary MOR 311 in PMO 360 is indexed by the first "0" portion of the address and contains a pointer to a PMO 310. The pointer to the PMO 310 is indicated in FIG. 3 by arrow 385. PMO 310 is indexed by the "3" portion of the address. MOR 311 contains an offset of "0," which is used to alter the index into the PMO under certain circumstances, as described below in detail. Similarly, mapping table entry 390 in mapping table 380 points to mapping table 381. Mapping table entries in this implementation do not include offsets. Mapping table 380 is associated with PMO 360 as indicated by arrow 320.

FIG. 3 illustrates the multi-level nature of the mapping tables. In the example, the highest order mapping table 380 contains pointers to mapping tables of the next lower order, etc. The lowest order mapping table indicate the location of pages that are swapped in.

When an application program references a page, operating system 108 first attempts to locate the page in physical memory via the mapping tables. If a page is not present in memory, one or more of the mapping tables will contain a "null" value to indicate that the page (or a memory space including the page) is not present. Thus, if a page fault occurs when accessing a page through the mapping tables (i.e., if a null value is encountered in a mapping table while trying to access the page), the associated PMO can be referenced to determine the location of the swapped out page. The page can then be located and swapped into memory. At the time that a page is swapped into memory, the mapping table entries for the page also are filled in to indicate the page's location in memory.

For example, in FIG. 3, if the mapping table 380 has a null pointer for a desired page, it is possible to go directly to PMO 360, since it is associated with mapping table 380. The path beginning with PMO 360 can then be traversed to locate the needed page. It should be understood that every MOR and every mapping table entry contains a value, but only selected PMOs, MORs and mapping table entries are shown in the Figures for the sake of clarity.

FIG. 4 is a diagram showing an exemplary format 400 of a PMO and an exemplary format 450 of a MOR of FIGS. 2 and 3. The PMO format 400 includes a header, which includes an omnibus wired (OW) flag 402; an Omnibus wired field 404; a min span code refer mapping reference (MSCR) field 406; a span 410 of the PMO, a doubly linked list 412 of all MORs that refer to this PMO; and the head of a singly linked list 414 of all the mapping tables that are associated with this PMO. The PMO also includes an array (or table) 417 of MORs that are in this PMO. In the described embodiment, the PMO has an I/O status of "ROVC" (read only virtual copy) if a number of MORs that refer to this PMO and have a VCState other than VCOriginal (i.e., NumDupRefs field 416) is non-zero.

Each MOR in a PMO has a format 450 shown in FIG. 4. The format 450 of each MOR includes forward and backwards pointers 452 for a doubly linked list of all MORs pointing to this memory object (a MOR can only point to one memory object at a time, but a memory object can be pointed to by more than one MOR). The MOR format 450 also includes a pointer 454 to an object that this MOR points directly to; an offset 456; an "involved bit" 458; a virtual copy state 460; and an index 462 of this MOR in the array 417 of the containing PMO. The index is a way to find this MOR's PMO.

FIG. 5 is a diagram showing an exemplary format 500 of an NSKMPage data structure in FIGS. 2 and 3. The term NSKMPage arises because the described embodiment is embodied in the Non-Stop Kernel (NSK) operating system, available from Tandem Computers of Cupertino Calif. Other non-Tandem nomenclature can, of course be used. In the example of FIG. 3, each NSKMPage represents 14 address bits. Thus, in the example, the span of each NSKMPage is $2^{14}$.

A NSKMPage data structure includes a doubly linked list 504 of all MORs that refer to this NSKMPage data structure. The NSKMPage data structure includes a field 505 that contains the number of MORs that refer to this NSKMPage data structure that are duplicates or subduplicates. The NSKMPage data structure also identifies a location 506 of the physical page corresponding to this NSKMPage data structure.

FIG. 6 is a diagram showing an exemplary format 600 of a mapping table of FIGS. 2 and 3. The mapping table format 600 includes a pointer 602 to the PMO that is associated with this mapping table. For example, PMO 360 is associated with mapping table 380 (as shown by dotted line 320 in FIG. 3). Note that not all PMOs are associated with a mapping table. The mapping table also includes a forward pointer for a singly linked list of all mapping tables associated with the PMO that is associated with this mapping table and an array of pointers 604 to next-lower-order mapping tables (or, for the lowest level mapping tables, to pages).

FIG. 7(a) is a diagram illustrating how processes can share memory. As shown in FIG. 7(a), MORs of a process A 702 can point to memory objects of a process B 704. Although not shown in FIG. 7(a), processes can also share mapping tables in a similar manner.

Figure 7B:
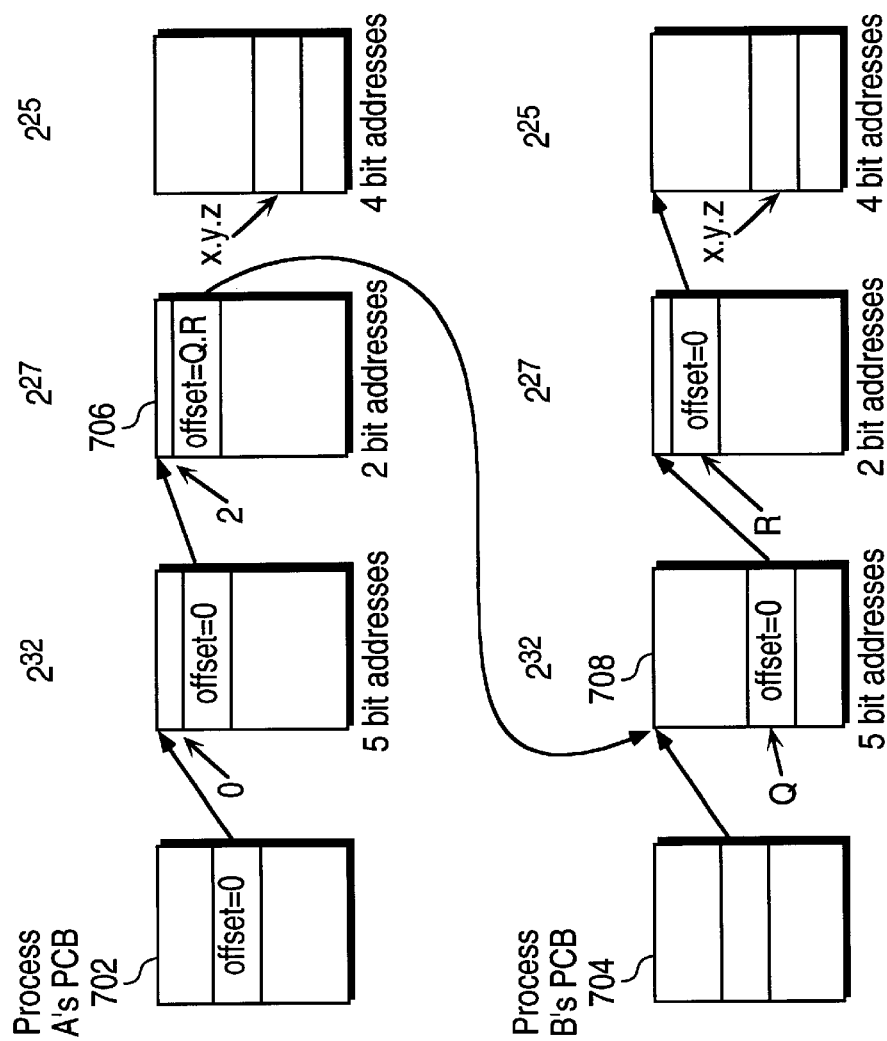
FIG. 7(b) is a diagram illustrating an example of an uplevel reference.

FIG. 7(b) is a diagram illustrating the concept of an "uplevel reference." In the example, the uplevel reference is a MOR 706, which normally refers to a first area of memory ($2^{25}$). MOR 706 opens a window on a second memory object 708 having a second, larger area of memory ($2^{32}$). Such uplevel references receive special treatment during the copy on write operation.

The situation of FIG. 7(b) might arise, for example, if process A 702 is a debugger computer program that is debugging process B 704. Since process A needs to look at process B's memory, process A maps a portion of the address space of process A onto the address space of process B. If MOR 706 is changed to point to PMO 708, then $2^{25}$ units of process B's address space is seen by process A. Any changes to B's address space are reflected in what A sees.

Figure 7C:
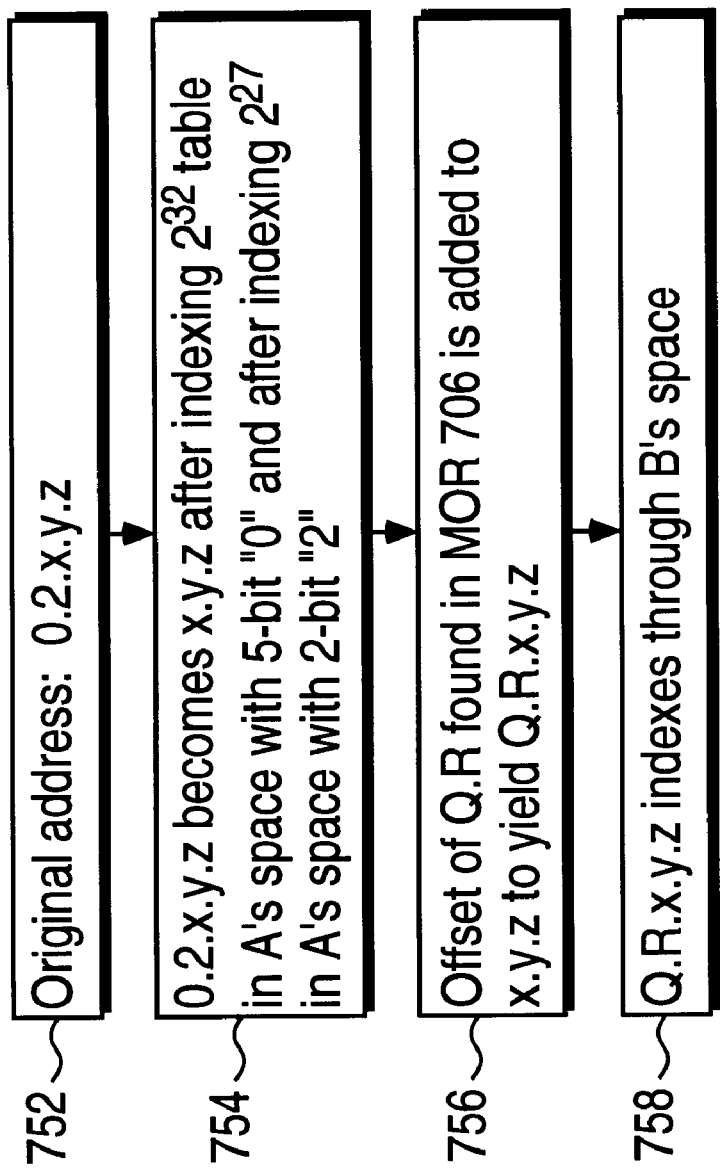
FIG. 7(c) is a flow chart explaining how a preferred embodiment of the present invention handles an uplevel reference.

FIG. 7(c) is a flow chart showing an example of how addressing is handled for an uplevel reference. Step 752 shows that the original address is 0.2.x.y.z. Step 754 shows that 0.2.z.x.y. becomes x.y.z after indexing $2^{32}$ table in A's space with 5-bit "0" and after indexing $2^{27}$ table in A's space with 2-bit "2". Step 756 shows that the offset of Q.R found in MOR 706 is appended to x.y.z to yield Q.R.x.y.z. Step 758 shows that the address Q.R.x.y.z indexes through B's address space. Of course, the address Q.R.x.y.z can only address a part of B's address space of size $2^{25}$.

III. Servicing a Page Fault and Setting the Involved Bits

In a virtual addressing system, in accordance with the present invention, each page referenced by a process is first accessed via the mapping tables. The mapping table entries have no offset fields and every mapping table points to the next smallest size mapping table.

A page fault occurs when a page is not mapped in a physical page table (a mapping table). When a page fault occurs, it is necessary to traverse the logical tables (PMOs) to find the location of the desired page on secondary or n-level memory. Once a null pointer is found in the mapping tables, it is possible to go directly to the logical tables since each mapping table has a pointer 602 (FIG. 6) to the PMO that is associated with that mapping table. For example, if in FIG. 3, the 8-bit mapping table 381 has a null pointer for a desired page (not shown), it is possible to go directly to the first of the four-bit PMOs 312, since it is associated with the mapping table 381. The path beginning with PMO 312 can then be traversed to locate the needed page.

Figure 8A:
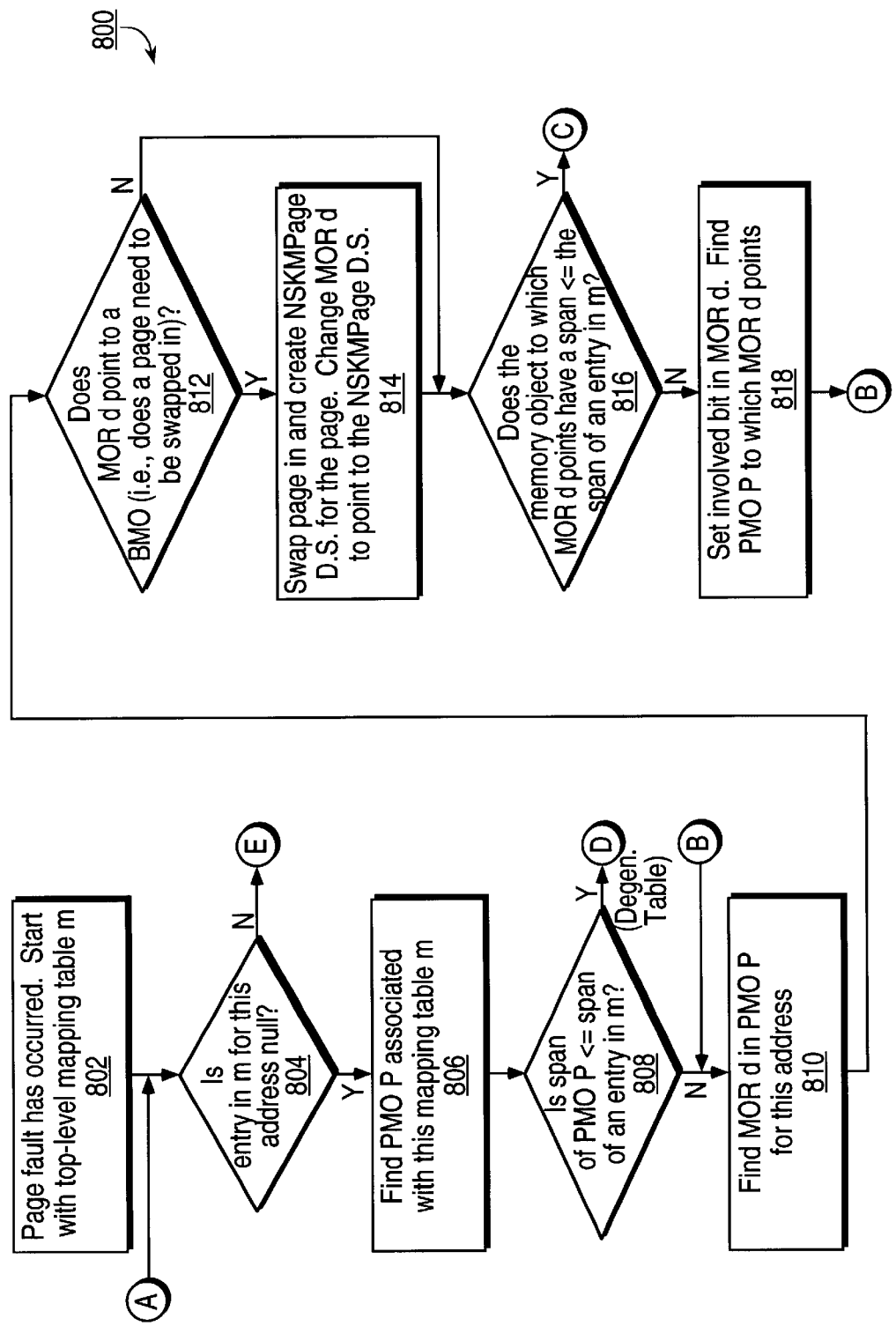
FIGS. 8(a) and 8(b) are flow charts showing a method of servicing a page fault, including setting certain involved bits.
Figure 8B:
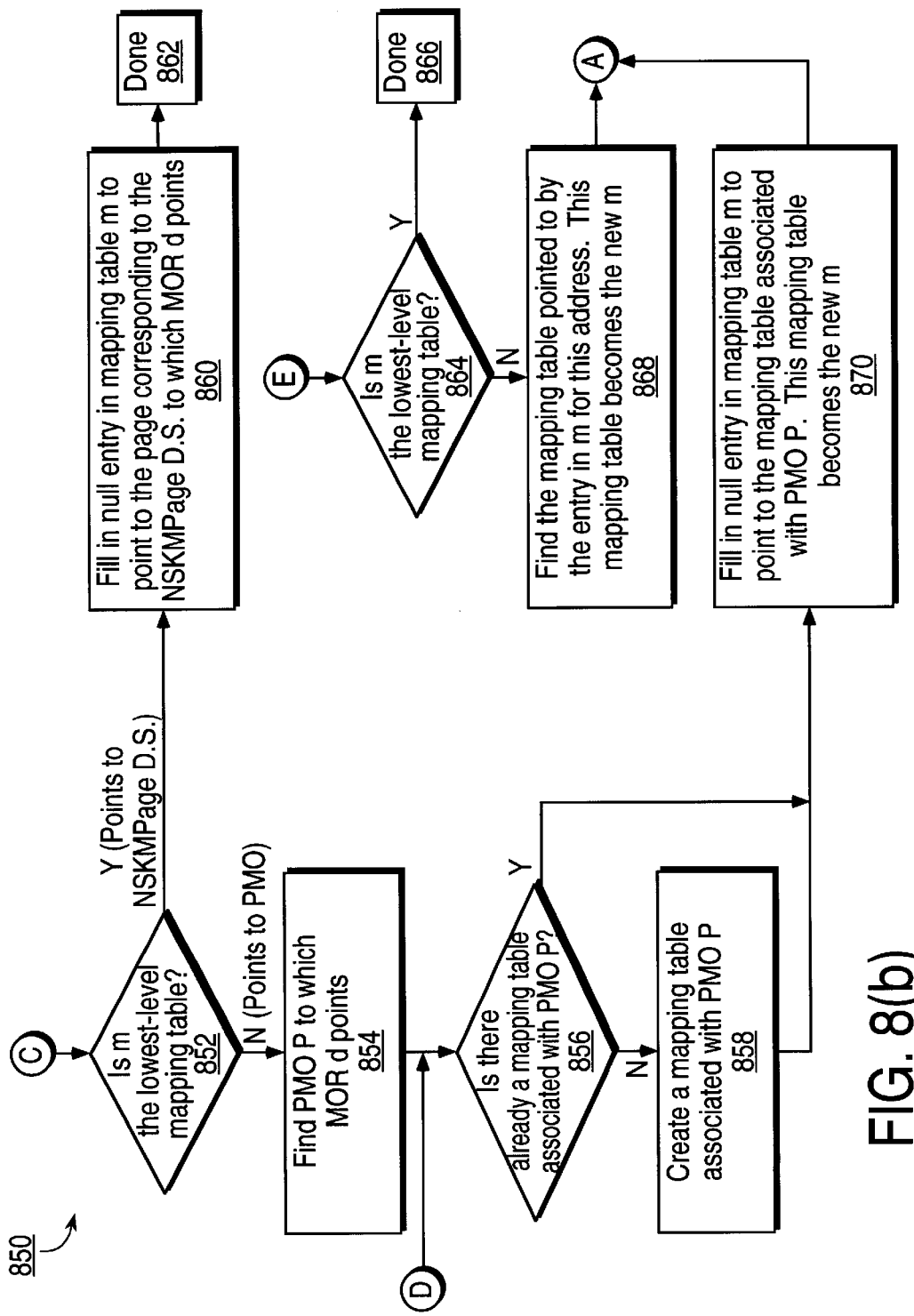
Figure 9A:
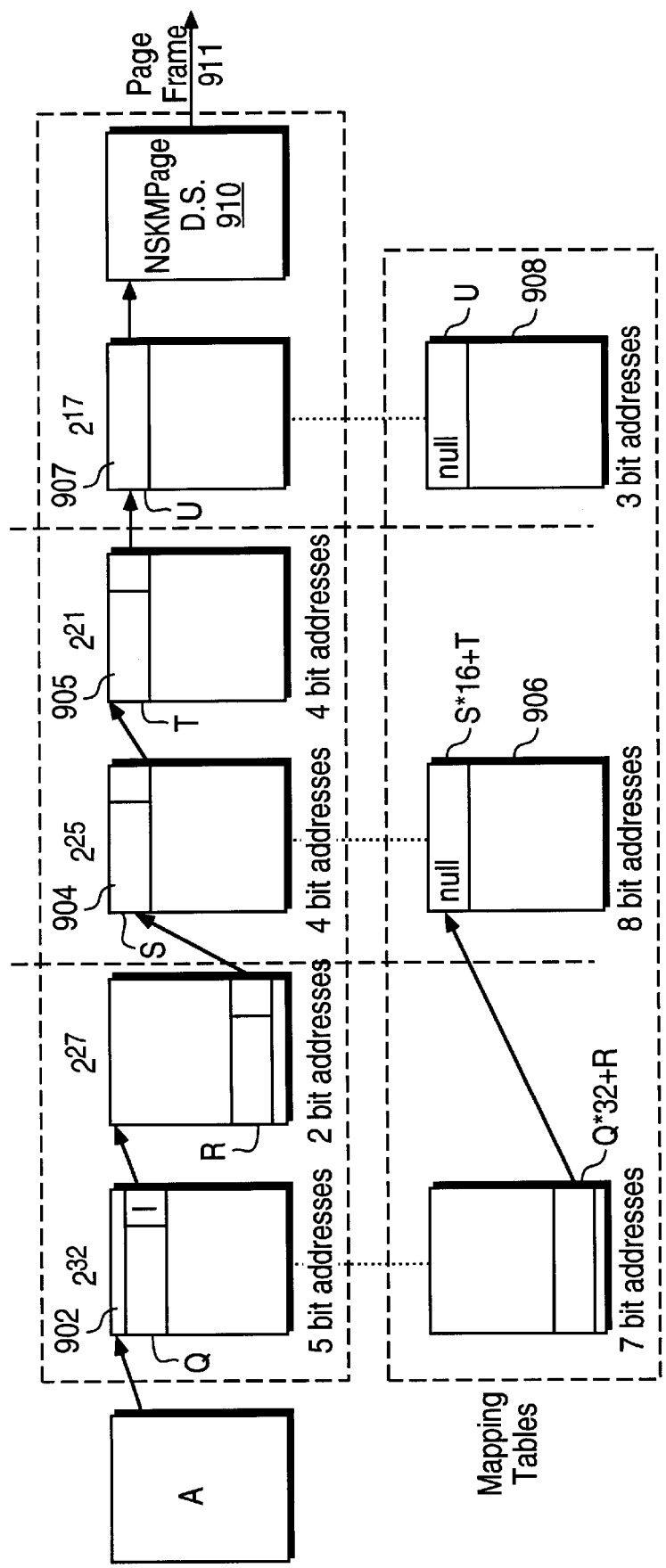
FIG. 9(a) shows an example of virtual memory tables before a page fault is serviced.
Figure 9B:
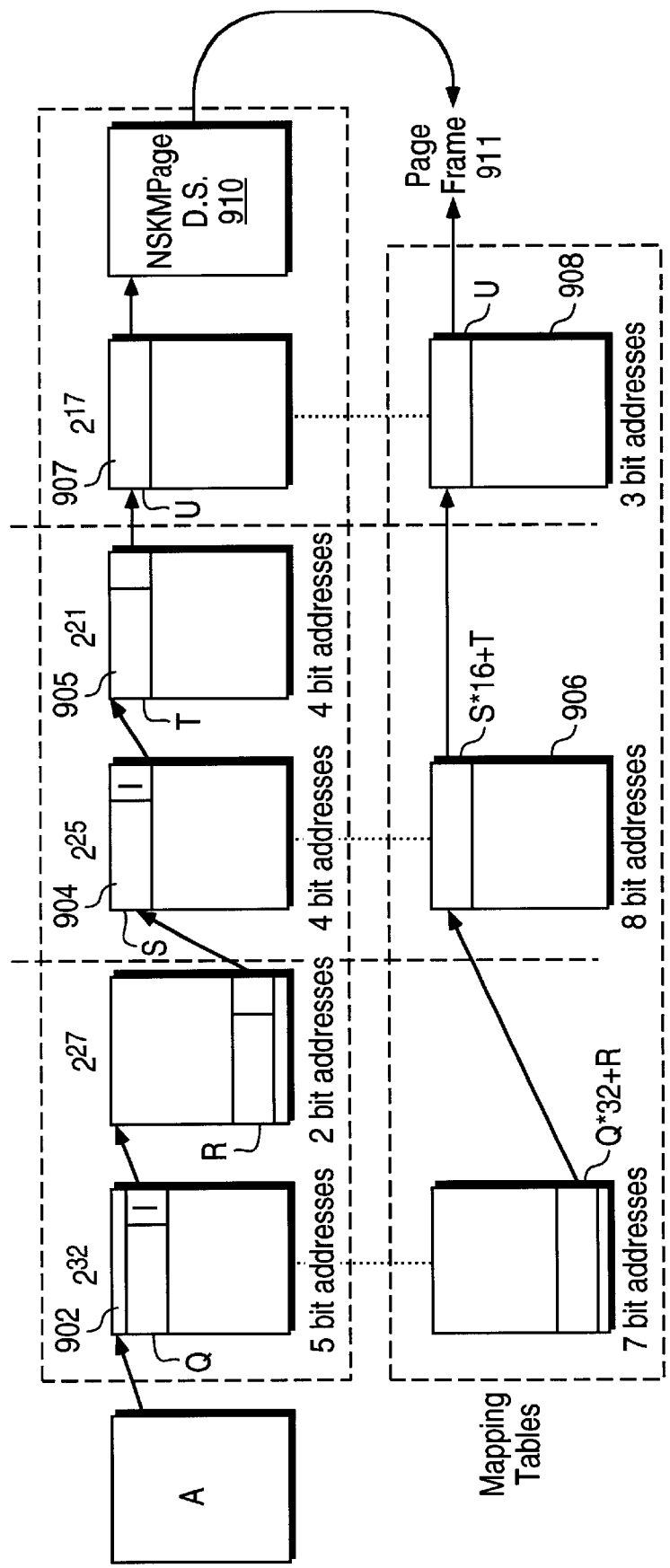
FIG. 9(b) shows an example of virtual memory tables after the page fault is serviced.

FIGS. 8(a) and 8(b) are flow charts showing a method of servicing a page fault, including setting certain involved bits. FIG. 9(a) shows an example of virtual memory tables before a page fault is serviced. FIG. 9(b) shows an example of virtual memory tables after the page fault is serviced. In the example of FIGS. 9(a) and 9(b), a null entry has been encountered in entry S*16+T in mapping table 906 (steps 802, 804). Step 806 finds the PMO P 904 associated with this mapping table m (i.e., associated with mapping table 906). In step 808, if the span of PMO P ($2^{21}$) is not less than or equal to the span of an entry in mapping table 906 ($2^{17}$), then control passes to step 810 (as is the case here). Step 810 finds MOR d (MOR S) in PMO P 904 for this address. If, in step 812, MOR d points to a BMO, then a page needs to be swapped in (not the case in the example).

Control then passes to step 816, which determines whether the memory object to which MOR d points has a span less than or equal to the span of an entry in mapping table m. Here, the memory object to which MOR d points (PMO 905) has a span ($2^{21}$) not less than or equal to the span of an entry in mapping table m ($2^{17}$). Thus, control passes to step 818, which sets the involved bit in MOR S of PMO 904 (shown as "I" in PMO 904 in FIG. 9(b)). PMO P becomes the PMO to which MOR d points. Thus the new PMO P is PMO 905 and control passes to step 810.

Step 810 finds MOR d (MOR T) in PMO P 905 for this address. If, in step 812, MOR d points to a BMO, then a page needs to be swapped in step 814 (not the case in the example).

In either case, control passes to step 816, which determines whether the memory object to which MOR d (MOR T) points has a span less than or equal to the span of an entry in mapping table m. Here, the memory object to which MOR d points (PMO 907) has a span ($2^{17}$) equal to the span of an entry in mapping table m ($2^{17}$). Thus, control passes to step 852 of FIG. 8(b). Step 852 determines whether mapping table m 906 is the lowest level mapping table. Here, it is not and control passes to step 854.

Step 854 finds PMO P 907 to which MOR d points and control passes to step 856. If step 856 determines that there is not already a mapping table associated with PMO P (PMO 907), a mapping table is created. Here, there is already a mapping table 908 for PMO 907. In either case, control passes to step 870. Step 870 fills in the mapping table entry S*16+T to point to the mapping table associated with PMO 907 (i.e., to point to mapping table 908). Mapping table 908 becomes the new mapping table m and control passes to step 804.

Step 806 finds the PMO P 907 associated with this mapping table m (i.e., with mapping table 908). In step 808, if the span of PMO P 907 ($2^{17}$) is not less than or equal to the span of an entry in mapping table 908 ($2^{14}$) (as is the case here), then control passes to step 810. Step 810 finds MOR d (MOR U) in PMO P 907 for this address. If, in step 812, MOR d points to a BMO, then a page needs to be swapped in (not the case in the example since MOR U in PMO 907 points to a NSKMPage data structure 910).

In either case, control passes to step 816, which determines whether the memory object to which MOR d points has a span less than or equal to the span of an entry in mapping table m. Here, the memory object to which MOR d points (NSKMPage data structure 910) has a span ($2^{14}$) equal to the span of an entry in mapping table m ($2^{14}$). Since the spans are equal, control passes to step 852

If, in step 852, mapping table m 908 is the lowest-level mapping table (which it is here), control passes to step 860. Otherwise, control passes to step 854, which finds the next PMO P and passes control to step 856.

Step 860 fills in the mapping table entry U to point to the page 911 corresponding to the NSKMPage data structure 910 to which MOR d (MOR U of PMO 907) points.

Thus, as shown in FIG. 9(*b*), after the page fault is serviced, the involved bit in MOR S of PMO 904 is set and respective entries in mapping table 906 and mapping table 908 are filled in so that they collectively reference the physical location of page 911. The involved bits in MOR T and MOR U are not set. As shown in the following examples, the involved bits are used to improve the efficiency of a later process to invalidate mapping table entries.

IV. Invalidating the Mapping Tables in Accordance with the Involved Bits

FIG. 10(*a*) is a flow chart 1000 showing steps performed to invalidate a mapping table entry when a MOR in the virtual memory tables is changed. "S", "T", etc. represents the index of the MOR in its PMO, and is also used to identify the MOR. In the example of FIGS. 12(*a*) and 12(*b*), MOR T in PMO 1202 is changed so that it no longer points to PMO 1204. Because this MOR is changed, the mapping table entry S*16+T in PMO 1205 needs to be invalidated. As discussed below in detail, step 1004 invalidates all mapping table references that depend on MOR d (MOR T) and are used in translating addresses relative to d in the range [0, span(d)). Further details of step 1004 are shown in FIG. 11.

FIG. 10(*b*) is a flow chart 1050 showing steps performed to invalidate mapping table entries when a page is swapped out. Steps 1054 through 1058 loop for each MOR d that refers to the swapped out page. Step 1056 invalidates mapping table references that depend on MOR d and are used in translating addresses relative to d in the range [0, page span). Further details of step 1056 are shown in FIG. 11.

Figure 11:
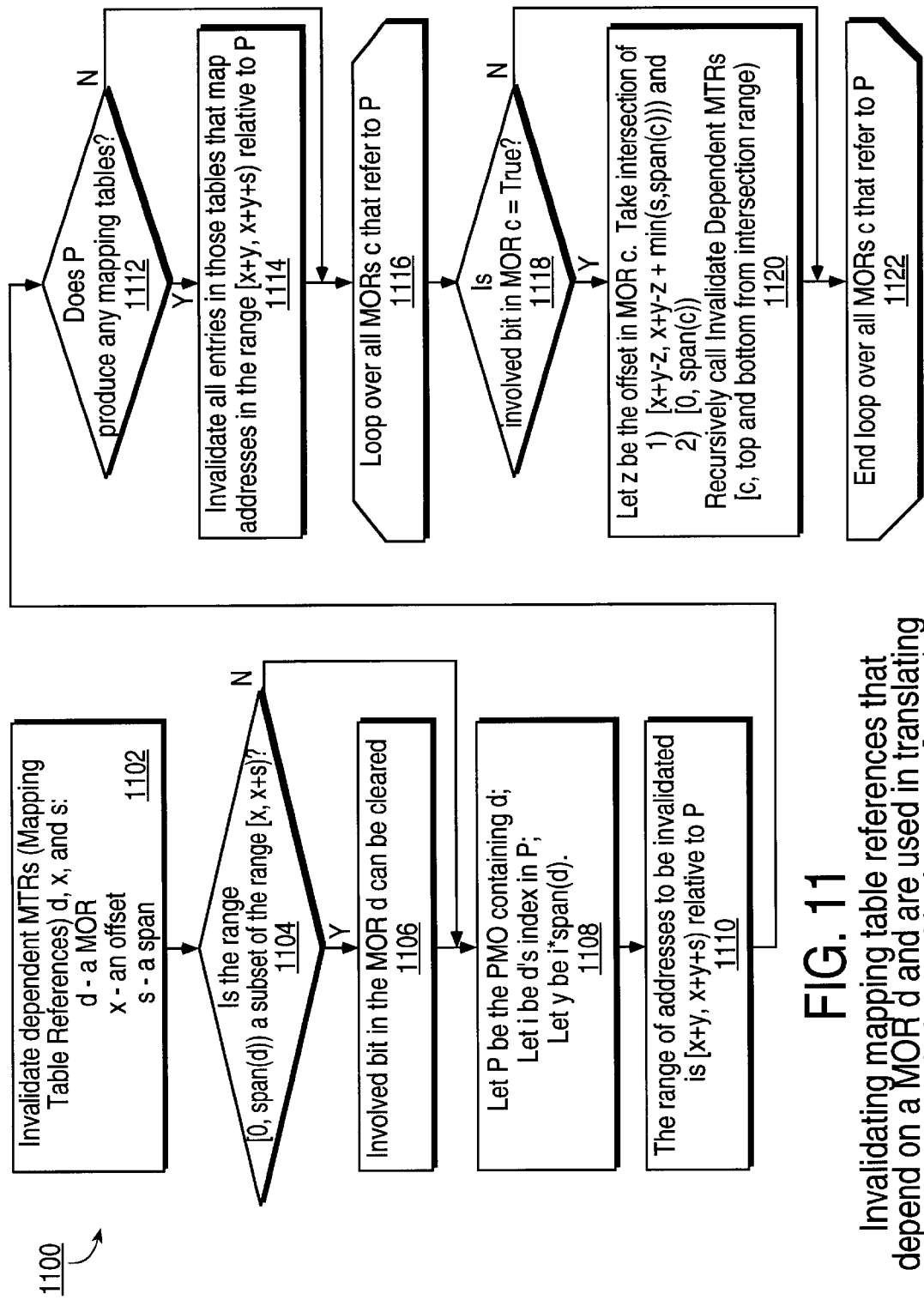
FIG. 11 is a flow chart showing additional steps performed to invalidate mapping table entries, in accordance with the involved bits.
Figure 12A:
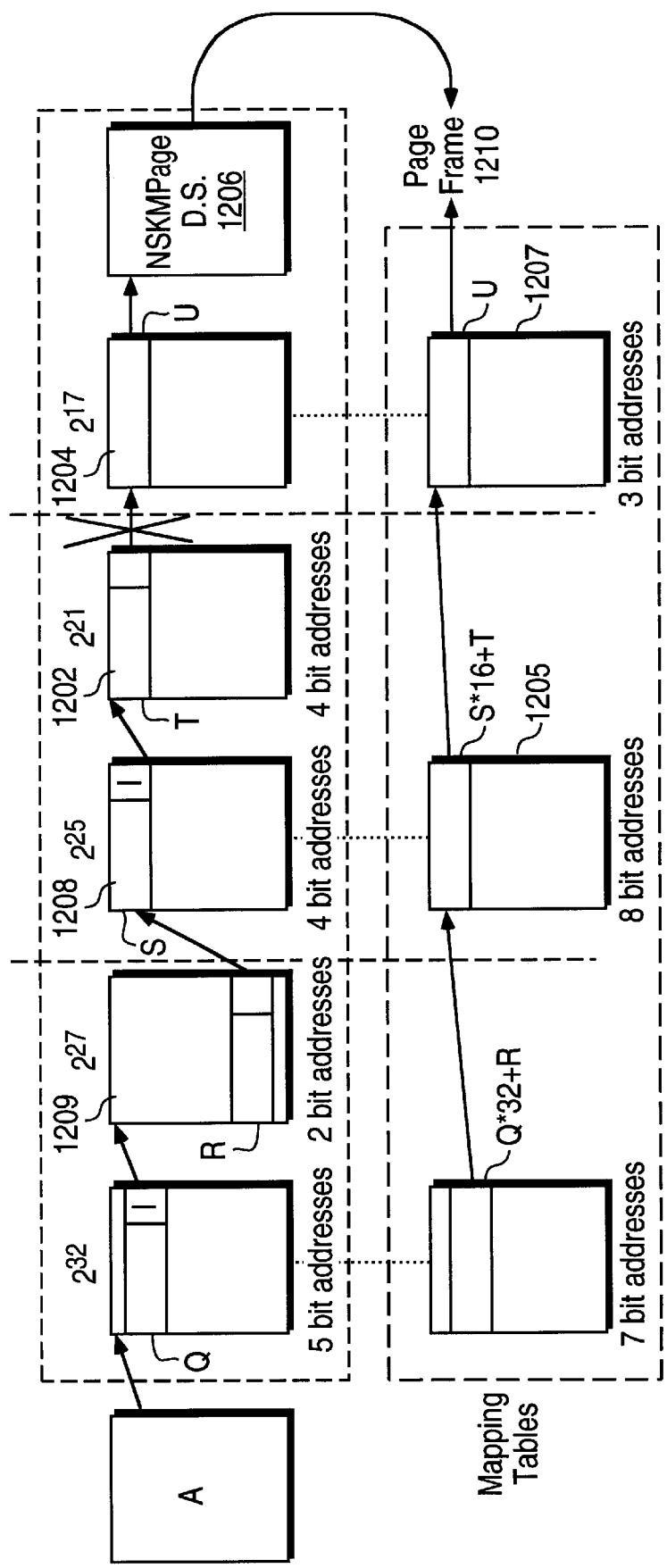
FIGS. 12(a) and 12(b) show a first example of invalidating mapping tables, in accordance with the involved bits.
Figure 12B:
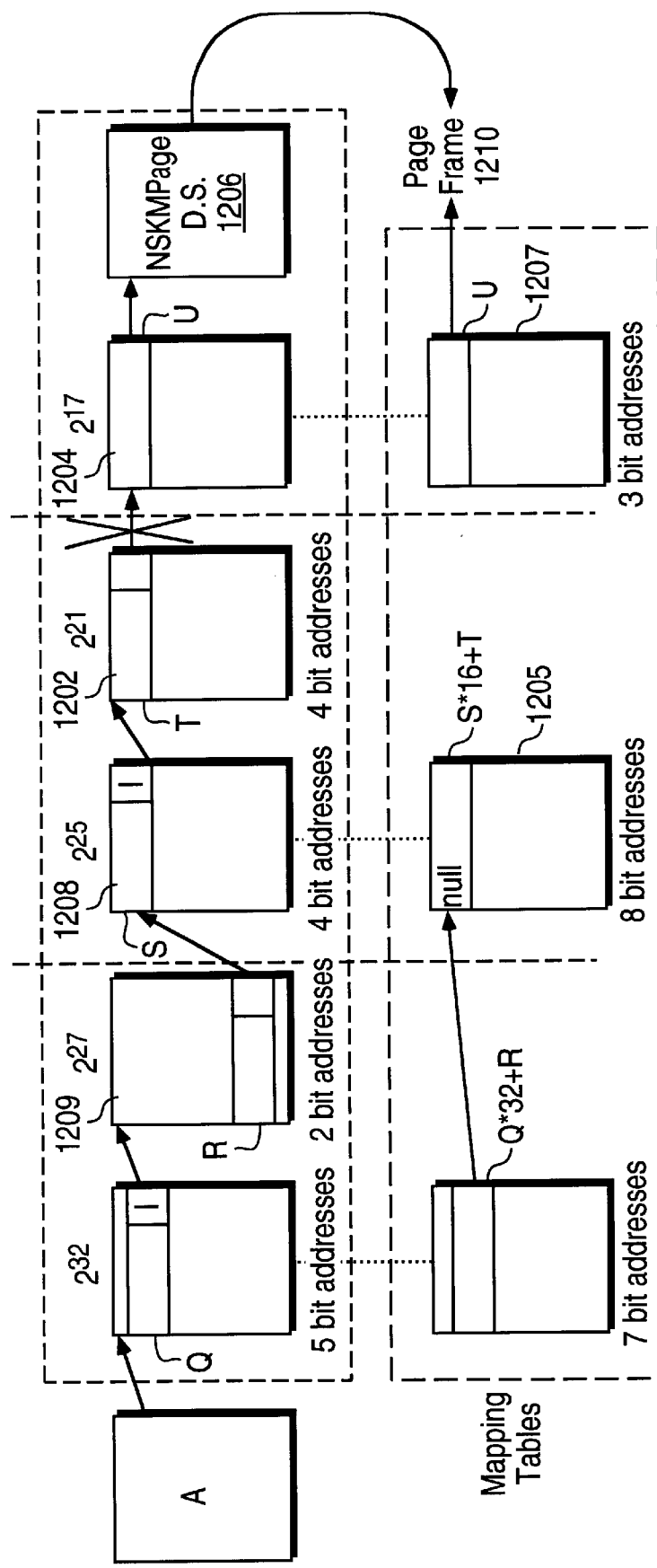

FIG. 11 is a flow chart 1100 showing additional steps performed to invalidate mapping table entries in accordance with the involved bits. FIGS. 12(*a*) and 12(*b*) show a first example of invalidating mapping tables in accordance with the involved bits. The following paragraphs describe the steps of FIG. 11 in conjunction with FIGS. 12(*a*) and 12(*b*).

In the example of FIGS. 12(*a*) and 12(*b*), MOR T of PMO 1202 is changed. Thus, the steps of FIG. 11 are used to invalidate the mapping table references that depend on MOR d (MOR T in PMO 1202) and are used in translating addresses relative to MOR d in the range [0, $2^{17}$). In step 1102, d is MOR T in PMO 1202; x is an offset of "0"; and s is $2^{17}$.

Step 1104 determines whether the range [0, span(d) (here, [0, $2^{17}$)) is a subset of the range [x, x+s) (here, [0, $2^{17}$)).

Here, it is a subset, so an involved bit in MOR d (MOR T of PMO 1202) can be cleared in step 1106 (although this involved bit is not set in this example). Step 1108 determines P to be the PMO containing MOR d (here P is PMO 1202). Step 1108 also determines i to be d's index in P (here, i=T). Step 1108 also determines y to be T*$2^{17}$. Step 1110 determines that the range of addresses to be invalidated is [x+y, x+y+s) relative to P. Here, the range of addresses to be invalidated is [T*$2^{17}$, T*$2^{17}$+$2^{17}$).

If, in step 1112, PMO P produces (is associated with) any mapping tables (here, PMO 1202 does not) entries in those mapping tables are invalidated. In either case, control passes to step 1116.

Steps 1116 through 1122 form a loop over all MORs c that refer to P. Here, only MOR S of PMO 1208 refers to P 1202, so MOR S of PMO 1208 is MOR c for the loop. In step 1118, if MOR c is involved, control passes to step 1120. In either case, control then passes to step 1122. Step 1120 determines z to be the offset in MOR c (here z="0"). Step 1120 then recursively calls the method of FIG. 11, with MOR c and a range of [T*$2^{17}$, T*$2^{17}$+$2^{17}$).

In the example, during the recursive call to step 1102, the steps of FIG. 11 are used to invalidate the mapping table references that depend on MOR d (MOR S in PMO 1208) and are used in translating addresses relative to MOR d in the range [T*$2^{17}$, T*$2^{17}$+$2^{17}$). In step 1102, d is MOR S in PMO 1208; x is an offset of T*$2^{17}$ and s is $2^{17}$.

Step 1104 determines whether the range [0, span(d)) (here, [0, $2^{21}$)) is a subset of the range [x, x+s) (here, [T*$2^{17}$, T*$2^{17}$+$2^{17}$)). Here, it is not a subset, so control passes to step 1108 and an involved bit in MOR d (MOR T of PMO 1202) is not cleared (as shown in FIG. 12(*b*)). Step 1108 determines P to be the PMO containing MOR d (here P is PMO 1208). Step 1108 also determines i to be d's index in P (here, i=S). Step 1108 also determines y to be S*$2^{21}$. Step 1110 determines that the range of addresses to be invalidated is [x+y, x+y+s) relative to P. Here, the range of addresses to be invalidated is [S*$2^{21}$+T*$2^{17}$, S*$2^{21}$+T*$2^{17}$+$2^{17}$).

If, in step 1112, PMO P produces any mapping tables (here, PMO 1208 does) entries in those mapping tables are invalidated. In either case, control passes to step 1116. Here, mapping table entry S*16+T is invalidated. (i.e., set to null), as shown in FIG. 12(*b*).

Steps 1116 through 1122 form a loop over all MORs c that refer to P. Here, only MOR R of PMO 1209 refers to PMO P (PMO 1208), so MOR R of PMO 1209 is MOR c for the loop. In step 1118, if MOR c is involved, control passes to step 1120. Here, because the involved bit in MOR R is not set, no further recursive calls are made and no further mapping tables entries are filled in for this path. Control passes to step 1122. The test of the involved bit in MOR d in step 1118 makes the process to invalidate mapping table entries more efficient since it stops backwards traversal of the tables.

In the example above, since MOR T is in PMO 1202, only a single mapping table entry needs to be invalidated and no involved bit is cleared. Note that if MOR S in PMO 1208 of FIG. 12(*a*) were to be changed (instead of MOR T in PMO 1202), sixteen entries in mapping table 1205 would need to be invalidated (instead of a single entry) and the involved bit in MOR S would need to be cleared (in step 1106).

FIGS. 13(*a*) and 13(*b*) show a second example of invalidating mapping tables, in accordance with the involved bits. The example involves an uplevel reference. In the following paragraphs, the steps of FIG. 11 are described in conjunction with FIGS. 13(*a*) and 13(*b*).

In the example of FIGS. 13(a) and 13(b), MOR K of PMO 1302 is changed. Thus, the steps of FIG. 11 are used to invalidate the mapping table references that depend on MOR d (MOR K in PMO 1302) and are used in translating addresses relative to MOR d in the range [0, $2^{27}$). In step 1102, d is MOR K in PMO 1302; x is an offset of "0"; and s is $2^{27}$.

Step 1104 determines whether the range [0, span(d)) (here, [0, $2^{27}$)) is a subset of the range [x, x+s) (here, [0, $2^{27}$)). Here, it is a subset, so an involved bit in MOR d (MOR K of PMO 1302) is cleared in step 1106. Step 1108 determines P to be the PMO containing MOR d (here P is PMO 1302). Step 1108 also determines i to be d's index in P (here, i=K). Step 1108 also determines y to be $i*2^{27}=K*2^{27}$. Step 1110 determines that the range of addresses to be invalidated is [x+y, x+y+s) relative to P. Here, the range of addresses to be invalidated is [$K*2^{27}$, $K*2^{27}+2^{27}$).

If, in step 1112, PMO P produces any mapping tables, entries in those mapping tables are invalidated. Here, PMO 1202 produces four ($2^2$) mapping table entries (not shown), which are invalidated. In either case, control passes to step 1116.

Steps 1116 through 1122 form a loop over all MORs c that refer to P. Here, only MOR J of PMO 1306 refers to P, so MOR J of PMO 1306 is MOR c for the loop. In step 1118, if MOR c is involved, control passes to step 1120. Here, MOR J is involved. Step 1120 determines z to be the offset in MOR c (here z="K.L"). Step 1120 then recursively calls the method of FIG. 11, with MOR c (MOR J of PMO 1306) and a range that is formed from an intersection of 1) range [x+y−z, x+y−z+s) and 2) range [0, span(c)). Note that for range (1), $x+y-z=0+K*2^{27}-K.L=0+K*2^{27}-(K*2^{27}+L*2^{25})=-L*2^{25}$. Thus, range(1)=[$-L*2^{25}$, $-L*2^{25}+2^{27}$). Range [0, span(c))=[0, $2^{25}$). Thus, in step 1120, the intersection of the two ranges is [0, $2^{25}$) and the recursive call is made for (c, 0, $2^{25}$).

In the example, during the recursive call to step 1102, the steps of FIG. 11 are used to invalidate the mapping table references that depend on MOR d (MOR J in PMO 1306) and are used in translating addresses relative to MOR d in the range [0, $2^{25}$). In step 1102, d is MOR J in PMO 1306; x is an offset of "0"; and s is $2^{25}$.

Step 1104 determines whether the range [0, span(d)) (here, [0, $2^{25}$)) is a subset of the range [x, x+s) (here, [0, $2^{25}$)). Here, it is a subset, so the involved bit in MOR J can be cleared (as shown in FIG. 13(b)). Step 1108 determines PMO 1306 to be the PMO containing MOR d. Step 1108 also determines i to be d's index in P (here, i=J). Step 1108 also determines y to be $J*2^{25}$. Step 1110 determines that the range of addresses to be invalidated is [x+y, x+y+s) relative to P. Here, the range of addresses to be invalidated is [$J*2^{25}$, $J*2^{25}+2^{25}$)

If, in step 1112, PMO P produces any mapping tables (here, PMO 1306 does not) entries in those mapping tables are invalidated. In either case, control passes to step 1116.

Steps 1116 through 1122 form a loop over all MORs c that refer to P. Here, only MOR H of PMO 1308 refers to P, so MOR H of PMO 1308 is MOR c for the loop. In step 1118, if MOR c is involved, control passes to step 1120. Here, MOR H is involved. Step 1120 determines z to be the offset in MOR c (here z="0"). Step 1120 then recursively calls the method of FIG. 11, with MOR c (MOR H of PMO 1308) and a range of [$J*2^{25}$, $J*2^{25}+2^{25}$).

In the example, during the recursive call to step 1102, the steps of FIG. 11 are used to invalidate the mapping table references that depend on MOR d (MOR H in PMO 1308) and are used in translating addresses relative to MOR d in the range [$J*2^{25}$, $J*2^{25}+2^{25}$). In step 1102, d is MOR H in PMO 1308; x is an offset of $J*2^{25}$; and s is $2^{25}$.

Step 1104 determines whether the range [0, span(d)) (here,[0, $2^{27}$)) is not a subset of the range [x, x+s) (here, [$J*2^{25}$, $J*2^{25}+2^{25}$)). Here, it is not a subset, so the involved bit in MOR H cannot be cleared (as shown in FIG. 13(b)). Step 1108 determines P to be the PMO containing MOR d (here P is PMO 1308). Step 1108 also determines i to be d's index in P (here, i=H). Step 1108 also determines y to be $H*2^{27}$. Step 1110 determines that the range of addresses to be invalidated is [x+y, x+y+s) relative to P. Here, the range of addresses to be invalidated is [$H*2^{27}+J*2^{25}$, $H*2^{27}+J*2^{25}+2^{25}$).

If, in step 1112, PMO P produces any mapping tables (here, PMO 1208 does) entries in those mapping tables are invalidated. In either case, control passes to step 1116. In this example, only mapping table entry H*32+J is invalidated (i.e., set to null) (as shown in FIG. 13(b)).

Steps 1116 through 1122 form a loop over all MORs c that refer to P. Here, because there are no MORs that refer to PMO 1308, no further recursive calls are made and no further mapping tables entries are set for this path. Control passes to step 1122.

In summary, the present invention improves the efficiency of mapping table invalidation by introducing the concept of involved bits. Involved bits are set in a path of logical tables when a page described by the logical tables is swapped into memory. When a MOR is changed or a page is swapped out, mapping tables that depend on the MOR/page are invalidated. Use of involved bits, however, allows the mapping table invalidation process to become more efficient, since it is not always necessary to traverse and invalidate the entire path of tables.

While the invention has been described in conjunction with a specific embodiment, it is evident that many alternatives, modifications and variations will be apparent to those skilled in the art in light of the foregoing description. Accordingly, it is intended to embrace all such alternatives, modifications and variations as fall within the spirit and scope of the appended claims and equivalents.

What is claimed is:

1. A method of invalidating at least one mapping table entry in a virtual memory, comprising:

determining that a logical table entry in the virtual memory has changed;

invalidating the at least one mapping table entry, where the at least one mapping table entry corresponds to a logical table entry that refers either directly or indirectly to the changed logical table entry, the invalidation occurring when that logical table entry has its involved bit set; and stopping invalidating the at least one mapping table entry, where the at least one mapping table entry corresponds to a logical table entry that refers either directly or indirectly to the changed logical table entry, the stopping of the invalidation occurring if that logical table entry has its involved bit clear.

2. The method of claim 1, further comprising performing a recursive call to invalidate additional mapping table entries when a corresponding logical table entry that refers directly or indirectly to the changed logical table entry has its involved bit set.

3. A method of servicing a page fault caused by a null entry in a mapping table in a virtual memory, comprising:

filling in a path of mapping table values to point to the page that caused the page fault; and setting an involved bit in a first logical table in the path when the memory object to which the first logical table points has a span greater than the span of an entry in a mapping table associated with said first logical table.

4. The method of claim 3, further comprising swapping in the page that caused the page fault if the page is not present in physical memory.

5. An apparatus that invalidates at least one mapping table entry in a virtual memory, comprising:
   a portion configured to determine that a logical table entry in the virtual memory has changed;
   a portion configured to invalidate the at least one mapping table entry, where the at least one mapping table entry corresponds to a logical table entry that refers either directly or indirectly to the changed logical table entry, the invalidating portion acting when that logical table entry has its involved bit set; and
   a portion configured to stop invalidating the at least one mapping table entry, where the at least one mapping table entry corresponds to a logical table entry that refers either directly or indirectly to the changed logical table entry, the stopping invalidating portion acting if that logical table entry has its involved bit clear.

6. The apparatus of claim 5, further comprising a portion configured to perform a recursive call to invalidate additional mapping table entries when a logical table that refers directly or indirectly to the changed logical table entry has its involved bit set.

7. An apparatus for servicing a page fault caused by a null entry in a mapping table in a virtual memory system, comprising:
   a portion configured to fill in a path of mapping table values to point to the page that caused the page fault; and
   setting an involved bit in a first logical table in the path when the memory object to which the first logical table points has a span greater than the span of an entry in a mapping table associated with said first logical table.

8. The apparatus of claim 7, further comprising a portion configured to swap in the page that caused the page fault if the page is not present in physical memory.

9. A computer program product, comprising:
   a computer-readable medium, including computer instructions, including:
      computer program code devices configured to cause a data processing system to determine that a logical table entry in the virtual memory has changed;
      computer program code devices configured to cause a data processing system to invalidate at least one mapping table entry, where the mapping table entry corresponds to a logical table entry that refers either directly or indirectly to the changed logical table entry, the invalidation occurring when that logical table entry has its involved bit set.

10. The computer program product of claim 9, further comprising computer program code devices configured to cause a data processing system to perform a recursive call to invalidate additional mapping table entries when a corresponding logical table entry that refers directly or indirectly to the changed logical table entry has its involved bit set.

11. A computer program product, comprising:
   a computer-readable medium, including computer instructions, including:
      computer program code devices configured to cause a data processing system to fill in a path of mapping table values to point to the page that caused the page fault; and
      computer program code devices configured to cause a data processing system to set an involved bit in a first logical table in the path when the memory object to which the first logical table points has a span greater than the span of an entry in a mapping table associated with said first logical table.

12. The computer program product method of claim 11, further comprising computer program code devices configured to cause a data processing system to swap in the page that caused the page fault if the page is not present in physical memory.

* * * * *